(12) United States Patent
Chang et al.

(10) Patent No.: US 7,933,358 B2
(45) Date of Patent: Apr. 26, 2011

(54) GFSK/FSK MODULATION CIRCUIT AND RELATED METHOD IMPLEMENTED IN A DIGITAL MANNER

(75) Inventors: Kwo-Wei Chang, Hsinchu County (TW); Wen-Jan Lee, Hsinchu (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 1184 days.

(21) Appl. No.: 11/563,688

(22) Filed: Nov. 28, 2006

(65) Prior Publication Data

US 2007/0211825 A1 Sep. 13, 2007

(30) Foreign Application Priority Data

Mar. 9, 2006 (TW) .............................. 95107995 A

(51) Int. Cl.
*H03C 3/00* (2006.01)
(52) U.S. Cl. ........ 375/303; 329/300; 331/179; 332/100; 375/269; 375/272; 375/323; 375/334
(58) Field of Classification Search .................... 375/225
See application file for complete search history.

(56) References Cited

U.S. PATENT DOCUMENTS 4,100,531 A * 7/1978 Fletcher et al. ............... 375/225

FOREIGN PATENT DOCUMENTS

| JP | S56152359 | | 11/1981 |
| JP | S62169554 | | 7/1987 |
| JP | S63254843 | A | 10/1988 |
| JP | H0423542 | | 1/1992 |
| JP | H04238439 | | 8/1992 |
| JP | 05-083306 | * | 4/1993 |
| JP | H0583306 | | 4/1993 |
| JP | H05219126 | | 8/1993 |
| JP | H0743620 | B2 | 5/1995 |
| JP | 09-149086 | * | 6/1997 |
| JP | H09149086 | | 6/1997 |
| JP | H1188303 | A | 3/1999 |
| JP | 2001-160834 | * | 6/2001 |
| JP | 2001160834 | | 6/2001 |
| JP | 2001285378 | | 10/2001 |
| JP | 2005294902 | A | 10/2005 |

* cited by examiner

*Primary Examiner* — David C. Payne
*Assistant Examiner* — Adolf Dsouza
(74) *Attorney, Agent, or Firm* — Winston Hsu; Scott Margo

(57) ABSTRACT

A Gaussian Frequency Shift Keying/Frequency Shift Keying (GFSK/FSK) modulation circuit implemented in a digital manner comprises a frequency divider for dividing frequency of an inputted clock signal to get a sampling signal, a buffer coupled to the frequency divider for storing inputted data, an integrator coupled to the buffer for processing integration according to the data outputted from the buffer, a first read only memory coupled to the integrator for transferring the data outputted from the integrator according to a cosine function, and a second read only memory coupled to the integrator for transferring the data outputted from the integrator according to a sine function.

21 Claims, 3 Drawing Sheets

GFSK/FSK MODULATION CIRCUIT AND RELATED METHOD IMPLEMENTED IN A DIGITAL MANNER

BACKGROUND OF THE INVENTION

1. Field of the Invention

The present invention is related to a Gaussian frequency shift keying/frequency shift keying (GFSK/FSK) modulating circuit and related method, and more particularly, to a modulation circuit and related method for implementing a GFSK/FSK in a digital manner.

2. Description of the Prior Art

Since electromagnetic waves were discovered in the end of the 19th century, the development of wireless communications has been changing with each passing day. Wireless communications has almost become a necessity whether in the field of business application or in everyday life. The frequency range of human hearing is about from 20 Hz to 20 kHz and it is difficult to transmit information via such low-frequency radio waves. Therefore, information transmission can be achieved by emitting higher-frequency radio waves (called Carriers) and concealing desired information into the carriers from which receivers can recover the messages. Through modulating and demodulating signals, information can be transmitted to great distances.

Bluetooth is a low-power and short-range wireless transmission technology, operating in a frequency band of 2.4 GHz. Many devices are inexpensive and can directly work without additional modifications on the original basic design. Bluetooth makes use of a Frequency Hopping Spread Spectrum (known as FHSS) technique to transmit and receive data and a Gaussian Frequency Shift Keying (known as GFSK) technique to modulate signals. Because GFSK modulation not only can efficiently reduce the transmission bandwidth but also is a low-cost modulation technique able to be implemented by simple IC design, it is widely adopted in wireless communications systems.

Please refer to FIG. 1. FIG. 1 illustrates a schematic diagram of a prior art GFSK modulation circuit 10. The GFSK modulation circuit 10 includes a pulse-shaping filter 12, a voltage controlled oscillator VCO, a loop filter, a reference oscillator XTAL, a phase/frequency detector 17, and a charge pump 18. A baseband modulating signal Sm first passes through the pulse-shaping filter 12, and then inputs to the voltage controlled oscillator VCO. The voltage controlled oscillator VCO generates a feedback signal So that inputs to the phase/frequency detector 17. The reference oscillator XTAL generates a reference clock signal Si that inputs to the phase/frequency detector 17. The phase/frequency detector 17 has a first input end 172 coupled to an output of the reference oscillator XTAL for receiving the reference signal Si and a second input end 174 coupled to an output of the voltage controlled oscillator VCO for receiving the feedback signal So. The phase/frequency detector 17 functions to estimate the phase difference between the input signals Si and So from the two corresponding input ends 172 and 174 so as to generate an error signal Se. When the reference signal Si has a phase lead to the feedback signal So, the error signal Se is an Up signal. When the reference signal Si has a phase lag to the feedback signal So, the error signal Se is a Down signal.

Please keep referring to FIG. 1. The input end 182 of the charge pump 18 coupled to the output end of the phase/frequency detector 17 functions to output a control current to the loop filter 14 in accordance with the received error signal Se. When the error signal Se is an Up signal, the charge pump 18 supplies more electricity to the loop filter 14. When the error signal Se is a Down signal, the charge pump 18 supplies less electricity to the loop filter 14. The loop filter 14 is a simple circuit design commonly comprising a capacitor which charges or discharges in accordance with the error signal Se. The loop filter 14 low-pass-filters the output control current of the charge pump 18 and generates a corresponding control voltage Sc. The voltage controlled oscillator VCO includes a first input end 124 coupled to an output end of the pulse shaped filter 12 and a second input end 144 coupled to an output end of the loop filter 14 for receiving the control voltage Sc in accordance with which the VCO adjusts the input signal of the first input end 124 to generate the feedback signal So.

As illustrated in FIG. 1, the feedback signal So performs at a specific frequency controlled by the control voltage Sc and furthermore feedbacks to the phase/frequency detector 17, which constantly estimates the phase difference between the received reference clock signal Si and the received feedback signal So. The loop filter 14 continues adjusting the control voltage Sc after receiving the control current outputted by the charge pump 18. Therefore, the voltage controlled oscillator VCO can continuously adjust the frequency of the feedback signal So in order to reduce the phase difference between the reference clock signal Si and the feedback signal So. Integrating the voltage controlled oscillator VCO, the loop filter 14, the phase/frequency detector 17, and the charge pump 18 constructs a feedback electronic circuit called a Phase Lock Loop, PLL. Thus the voltage controlled oscillator VCO driven by the control voltage Sc adjusts its own output frequency to ideally reduce the phase difference. By duplicating and tracking the phase and frequency of its own input again and again, the VCO enables the Phase Lock Loop to lock at the ideal desired frequency.

As illustrated in FIG. 1, the GFSK modulation circuit 10 further comprises a switch SW1 coupled between the charge pump 18 and the loop filter 14. When the Phase Lock Loop begins to process modulation, the switch SW1 switches on. When the Phase Lock Loop begins to do phase locking, the switch SW1 switches off, thereby capable of avoiding the frequency shift when the frequency of the baseband modulating signal Sm is too low.

Among prior arts, it is common to implement modulation circuits in an analog manner. In general, the baseband modulating signal Sm directly drives the voltage controlled oscillator VCO, but in order to achieve GFSK modulation, the baseband modulating signal Sm beforehand passes through a pulse shaped filter 12 that commonly comprises resistances, inductances, and capacitors. The shortcoming of the pulse shaped filter 12 is that the modulation parameters such as a modulation index and a pulse shaped factor cannot precisely be controlled. Besides, in order to avoid the frequency shift when the frequency of the baseband modulating signal Sm goes too low, the open-loop control, SW1 as shown in FIG. 1, is needed, resulting in the higher complexity of the circuit design and the longer time consumption.

SUMMARY OF THE INVENTION

It is therefore an object of the claimed invention to provide a Gaussian frequency shift keying/frequency shift keying (GFSK/FSK) modulation circuit.

A Gaussian frequency shift keying/frequency shift keying (GFSK/FSK) modulation circuit includes a frequency divider, a buffer, an integrator, a first read only memory, and a second read only memory. The frequency divider is used for dividing frequency of an inputted clock signal to get a sampling signal. The buffer is coupled to the frequency divider and used for storing inputted data. The integrator is coupled to the buffer and used for processing integration according to the data outputted from the buffer. The first read only memory is coupled to the integrator and used for transferring the data outputted from the integrator according to a cosine function. The second read only memory is coupled to the integrator and used for transferring the data outputted from the integrator according to a sine function. The GFSK/FSK modulation circuit further comprises a third read only memory. The third read only memory is coupled to the frequency divider and the buffer and used for storing the data after the frequency divider over-samples the data of the buffer and transferring the data after over-sampling according to a Gaussian function to the integrator.

It is therefore an object of the claimed invention to provide a Gaussian frequency shift keying/frequency shift keying (GFSK/FSK) modulating method.

A Gaussian frequency shift keying/frequency shift keying (GFSK/FSK) modulating method includes dividing a frequency of a clock signal to generate a sampling signal, storing inputted data, integrating the stored data, transferring the data after integration according to a cosine function, and transferring the data after integration according to a sine function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
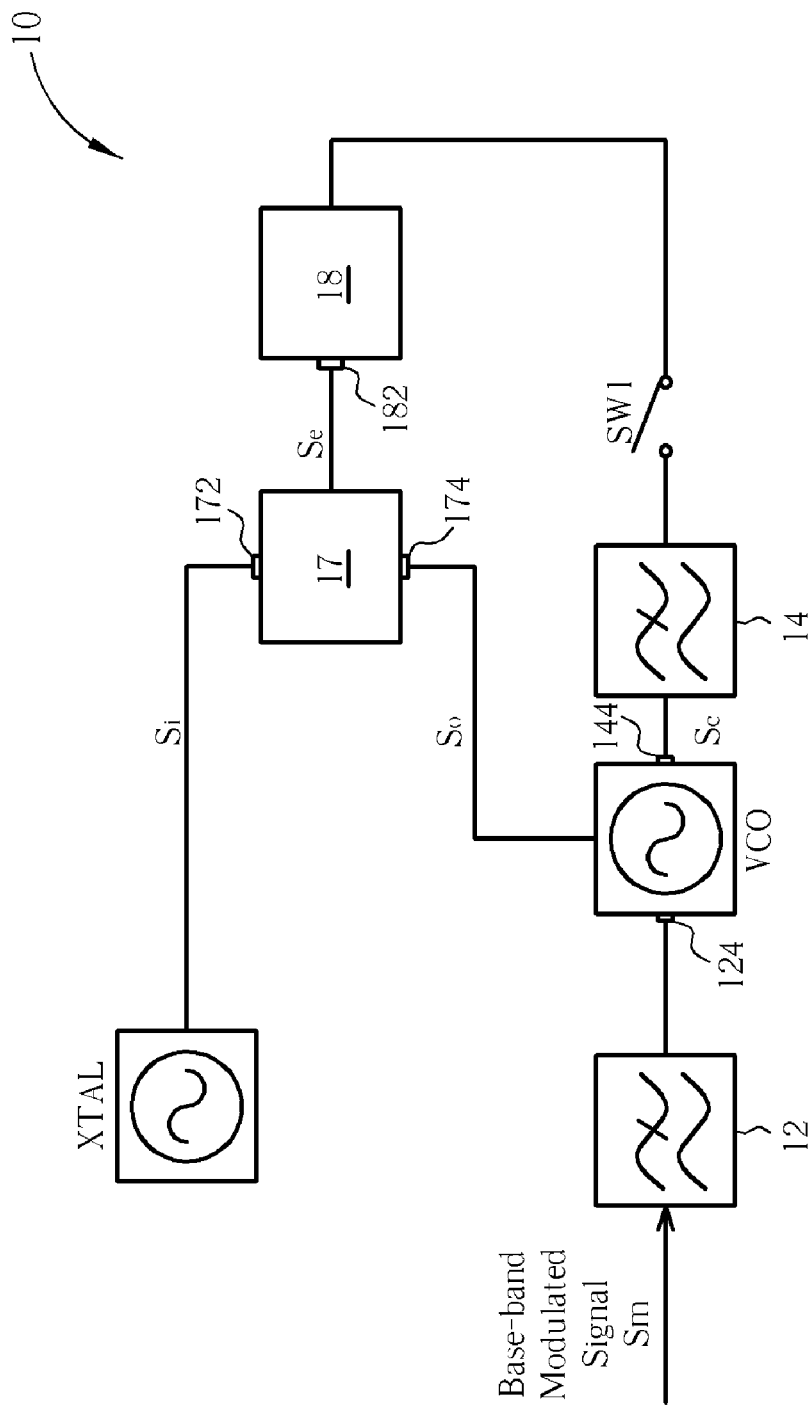
FIG. 1 illustrates a schematic diagram of the prior art Gaussian frequency shift keying (GFSK) modulation circuit.
Figure 2:
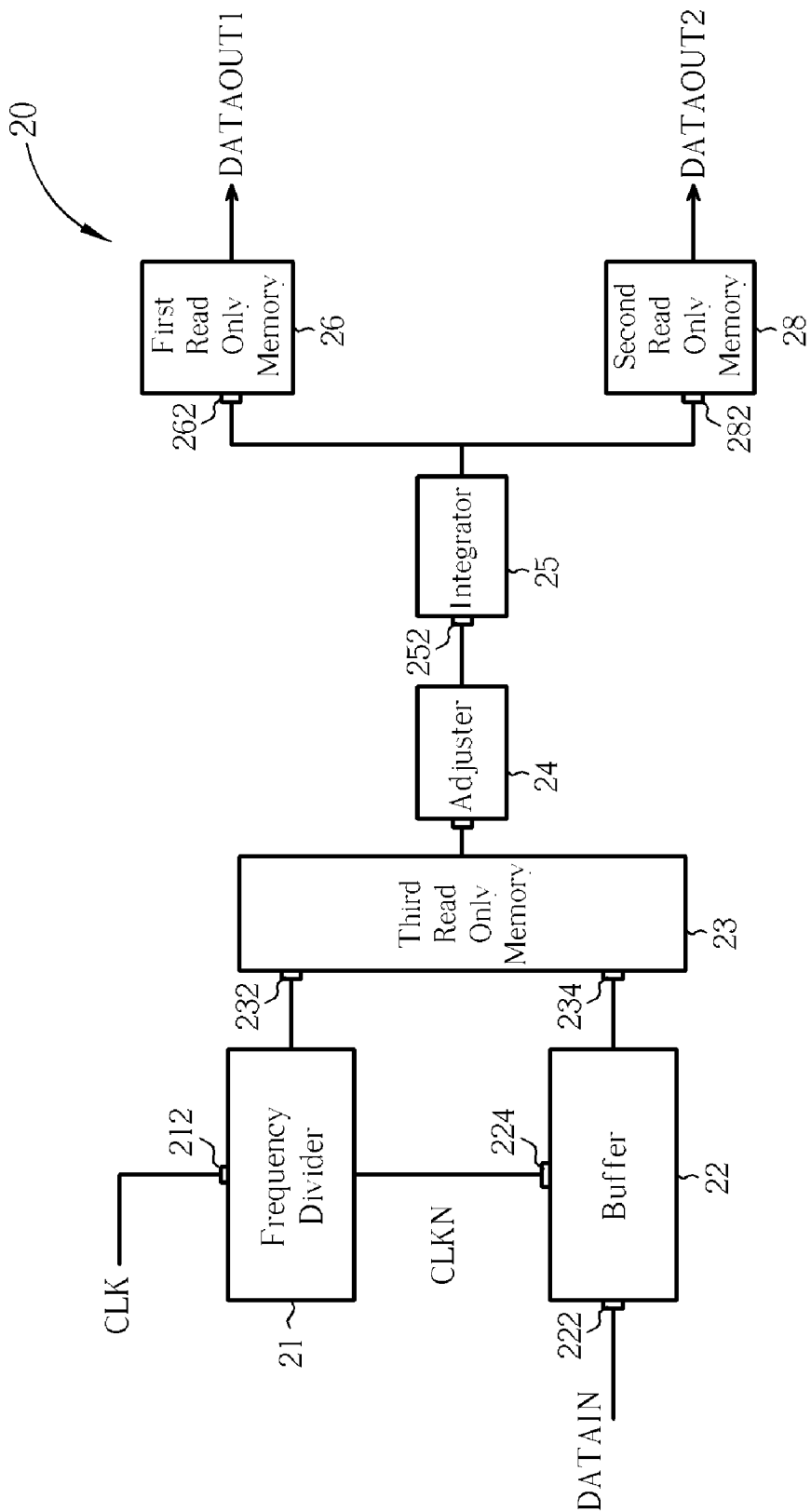
FIG. 2 illustrates a block diagram of the present invention Gaussian frequency shift keying (GFSK) modulation circuit.

Please refer to FIG. 2. FIG. 2 illustrates a block diagram of the present invention Gaussian frequency shift keying (GFSK) modulation circuit 20. The GFSK modulation circuit 20 comprises a frequency divider 21, a buffer 22, a third read only memory 23, an integrator 25, a first read only memory 26, and a second read only memory 28. An input end 212 of the frequency divider 21 coupled to a clock signal CLK is used for dividing a frequency of the inputted clock signal CLK to get a sampling signal CLKN. Assume that the clock signal CLK runs at a frequency f, and if the frequency divider 21 is about to achieve an n times sampling rate, the sampling signal CLKN will perform at a frequency f/n after the clock signal CLK passes through the frequency divider 21. The buffer 22 has a first input end 222 used for receiving an input signal DATAIN and a second input end 224 coupled to a first output of the frequency divider 21 for receiving the sampling signal CLKN. The buffer 22 is used for registering a series of the input signal DATAIN and for storing and forwarding the data obtained from over-sampling the input signal DATAIN in accordance with the sampling signal CLKN to the third read only memory 23.

Please keep referring to FIG. 2. The third read only memory 23 is employed as a Gaussian filter. Theoretically, the impulse response of a Gaussian filter extends to infinity on time domain, but under consideration with the circuit complexity and the tolerance of the signal error, j bits can represent the shape of the impulse response. With using n sampling points to represent the shape of each impulse response, a tolerable error value can be calculated where m bits represent each sampling point. When the j and m bit information is stored in the third read only memory 23 and read out by table look-up function, the functionality of Gaussian filter can be realized.

The third read only memory 23 comprises a first input end 232 coupled to a second output end of the frequency divider 21 and a second input end 234 coupled to an output end of the buffer 22. The third read only memory 23 stores the data after the frequency divider 21 over-samples the data of the buffer 22 in accordance with both input signals of the two input ends 232,234 and transfers the data after over-sampling according to a Gaussian function and then reads out the data by table look-up.

The integrator 25 comprises an input end 252 coupled to an output end of the third read only memory 23 for processing integration according to the data outputted from the read only memory 23. The integrator 25 is an accumulator for achieving the purpose of integration. The first read only memory 26 has an input end 262 coupled to an output of the integrator 25. The first read only memory 26 transfers the data outputted from the integrator 25 according to a cosine function in accordance with the input signal of the input end 262 and outputs an output signal DATAOUT1 by table look-up. The second read only memory 28, having an input end 282 coupled to the output end of the integrator 25 transfers the data outputted from the integrator 25 according to a sine function in accordance with the input signal of the input end 282 and outputs an output signal DATAOUT2 by table look-up.

As illustrated in FIG. 2, the GFSK modulation circuit 20 further comprises an adjuster 24 coupled between the third read only memory 23 and the integrator 25 for adjusting the numbers of bits of the data outputted by the third read only memory 23. The GFSK modulation circuit 20, the buffer 22, the third read only memory 23, the integrator 25, the first read only memory 26 and the second read only memory 28 can be implemented by digital circuits.

Figure 3:
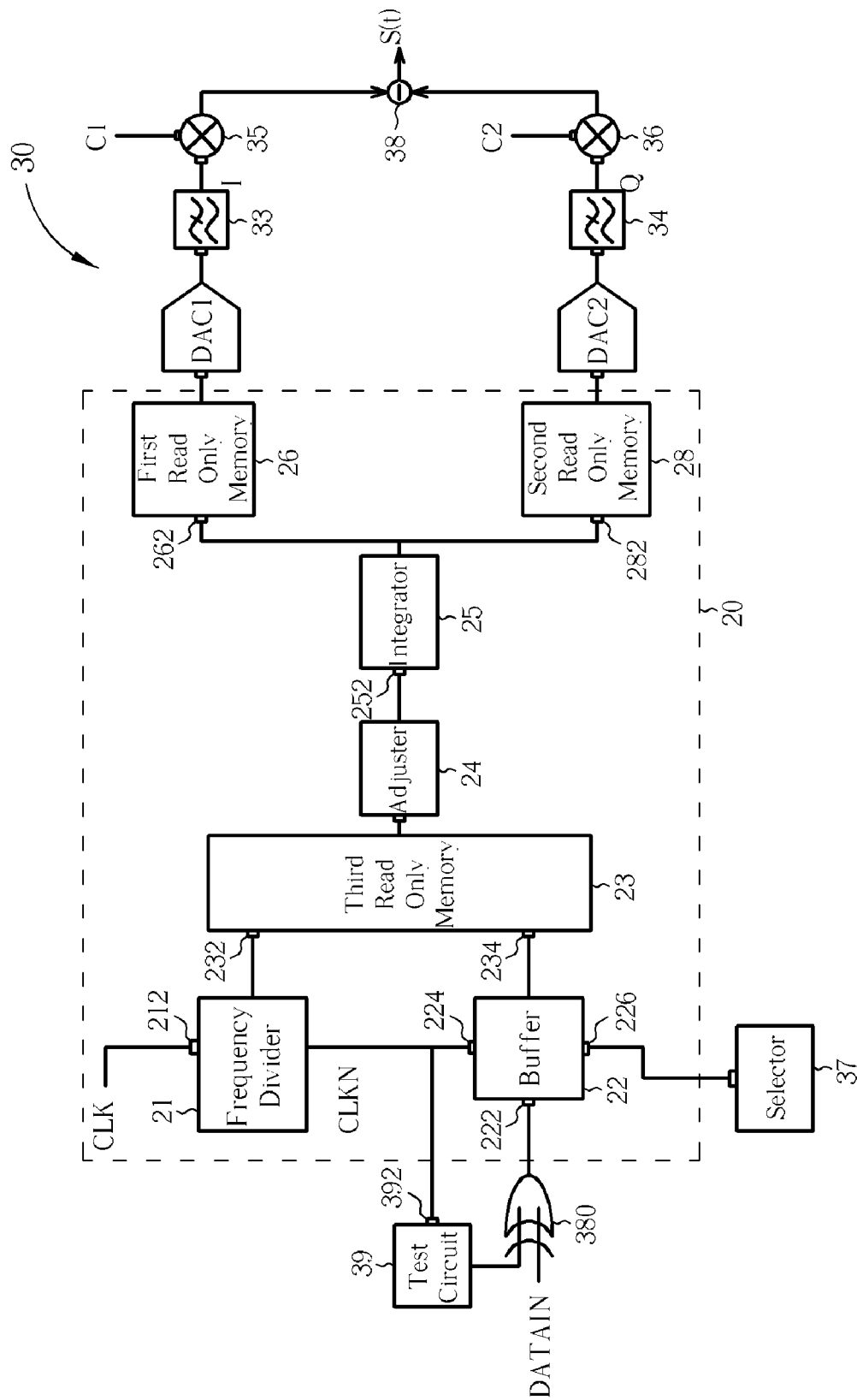
FIG. 3 illustrates a block diagram of the present invention Gaussian frequency shift keying/frequency shift keying (GFSK/FSK) modulation circuit.

Please refer to FIG. 3. FIG. 3 illustrates a block diagram of the present invention Gaussian frequency shift keying/frequency shift keying (GFSK/FSK) modulation circuit 30. The GFSK/FSK modulation circuit 30 comprises the Gaussian frequency shift keying/frequency shift keying (GFSK) modulation circuit 20 illustrated in FIG. 2 and moreover a selector 37 and a test circuit 39. The selector 37 is coupled to a third input end 226 of the buffer 22 and used for selecting whether the data outputted from the buffer 22 into the integrator 25 passes through the third read only memory 23. When the selector 37 determines to input the data outputted from the buffer 22 into the third read only memory 23, it indicates that the data needs to be transferred by a Gaussian function as the GFSK/FSK modulation circuit 30 chooses to use a Gaussian frequency shift keying modulation. Otherwise, when the selector 37 directly inputs the data outputted from the buffer 22 into the integrator 25, it indicates that this data doesn't need to be transferred by a Gaussian function, which means the GFSK/FSK modulation circuit 30 chooses to use a frequency shift keying modulation. The test circuit 39 is coupled between the frequency divider 21 and the buffer 22. An input end 392 of the test circuit 39 is adapted to receive the sampling signal CLKN generated by the frequency divider 21 and to use the sampling signal CLKN to generate a sequence of pseudo random noise such that the data inputted to the buffer 22 distributes more randomly. The GFSK/FSK modulation circuit 30 further comprises an exclusive OR gate 380. Two input ends of the exclusive OR gate 380 are adapted to receive the input signal DATAIN and the pseudo-random-noise sequence generated by the test circuit 39 and the output of the exclusive OR gate 380 is coupled to the first input end 222 of the buffer 22. The exclusive OR gate 380 functions to do a logical operation on the input signal DATAIN and the pseudo-random-noise sequence to generate a set of output data. The first input 222 of the buffer 22 is adapted to receive the foregoing data outputted by the exclusive OR gate 380 and the buffer 22 processes the follow-up related operations.

Please keep referring to FIG. 3. The GFSK/FSK modulation circuit 30 further comprises a first digital-to analog (D/A) converter DAC1, a second digital-to analog (D/A) converter DAC2, a first low-pass filter 33, a second low-pass filter 34, a first mixer 35, a second mixer 36, and a subtractor 38. The D/A converter DAC1 is coupled to the first read only memory 26 for transforming the data outputted by the first read only memory 26 into an analog signal. The first low-pass filter 33 is coupled to the first D/A converter DAC1 for filtering the analog signal transformed by the first D/A converter DAC1 to generate a first baseband signal I. The first mixer 35 is coupled to the first low-pass filter 33 for mixing the first baseband signal I with a first carrier signal C1. The second D/A converter DAC2 is coupled to the second read only memory 28 for transforming the data outputted from the second read only memory 28 into an analog signal. The second low-pass filter 34 is coupled to the second D/A converter DAC2 for filtering the analog signal transformed by the second D/A converter DAC2 to generate a second baseband signal Q. The second mixer 36 is coupled to the second low-pass filter 34 for mixing the second baseband signal generated by the second low-pass filter 34 with a second carrier signal C2. The subtractor 38 is coupled to the first mixer 35 and the second mixer 36 for generating a difference between the signals outputted from the first mixer 35 and the second mixer 36, and outputting a frequency-modulation signal S(t). The frequency modulation signal S(t) can be represented as:

$$S(t)=\cos(wt+\int f(t)dt)$$
$$=\cos wt^* \cos(\int f(t)dt) - \sin wt^* \sin(\int f(t)dt);$$

where f(t) is the signal received by the input end 252 of the integrator 25 and $\int f(t)dt$ is the signal, which has been integrated by the integrator 25; $\cos(\int f(t)dt)$ is the first baseband signal I and $\sin(\int f(t)dt)$ is the second baseband signal Q; cos wt is the first carrier signal C1 and sin wt is the second carrier signal C2; the first carrier signal C1 and the second carrier signal C2 are orthogonal to each other.

An additional one-bit-reduction device (not shown in FIG. 3) can be placed between the first read only memory 26 and the integrator 25 illustrated in FIG. 3. The one-bit-reduction device utilities the symmetric property of a cosine function to reduce the numbers of bits needed to be stored in the first read only memory 26. Another one-bit-increment device can additionally be placed between the first read only memory 26 and the first D/A converter DAC1 functions to recover the data, which has been processed by the one-bit-reduction device. In the same way, an additional one-bit-reduction device (not shown in FIG. 3) can be placed between the second read only memory 28 and the integrator 25 illustrated in FIG. 3. The one-bit-reduction device utilities the symmetric property of a sine function to reduce the numbers of bits needed to be stored in the second read only memory 28. Another one-bit-increment device can additionally be placed between the second read only memory 28 and the second D/A converter DAC2 functions to recover the data, which has been processed by the one-bit-reduction device.

Under the consideration with the circuit complexity and the tolerance of a signal error, j bits can represent the shape of the impulse response, and where j is not a fixed number, adaptive to users' need and the error tolerance. The shape of each impulse response can be represented by n sampling points represented by m bits, and where m and n are not fixed numbers. Furthermore, several additional devices are employable in the circuit for efficiently reducing the data load of the third read only memory 23 by utilizing the symmetric property of the shape of the impulse response. Similarly, the data load, stored in the cosine/sine-shape tables in the first/second read only memory 26/28, can be reduced due to the symmetric property of the shape of the impulse response.

The present invention provides a Gaussian frequency shift keying (GFSK) modulation circuit 20 and a Gaussian frequency shift keying/frequency shift keying (GFSK/FSK) modulation circuit 30 implemented by digital circuits. The functionality of a Gaussian filter can be realized by look-up tables recording the shape of a Gaussian function in the third read only memory 23, and moreover the error tolerance and modulation indices can be controlled by selecting the parameters such as m, n, and etc. In contrast to the prior art, the present invention has no such problem of circuit delay caused by the open-loop-circuit design. In addition, the present invention further comprises a selector 37 for selecting whether the data outputted from the buffer 22 into the integrator 25 passes through the third read only memory 23 or not. It means that utilizing software switching enables to achieve a quick switch to GFSK modulation or FSK modulation and is easily to adopt various modulations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Gaussian Frequency Shift Keying/Frequency Shift Keying (GFSK/FSK) modulation circuit implemented in a digital manner comprising:
   a frequency divider for dividing frequency of an inputted clock signal to get a sampling signal;
   a buffer coupled to the frequency divider for storing inputted data;
   an integrator coupled to the buffer for processing integration according to the data outputted from the buffer;
   a first read only memory coupled to the integrator for transferring the data outputted from the integrator according to a cosine function;
   a second read only memory coupled to the integrator for transferring the data outputted from the integrator according to a sine function; and
   a third read only memory coupled to the frequency divider, the buffer and the integrator, the third read only memory is used for storing the data after the frequency divider over-samples the data of the buffer and transferring the data after over-sampling according to a Gaussian function to the integrator.

2. The GFSK/FSK modulation circuit of claim 1 further comprising a first digital-to-analog converter coupled to the first read only memory for transforming the data outputted from the first read only memory into an analog signal.

3. The GFSK/FSK modulation circuit of claim 2 further comprising a first low-pass filter coupled to the first digital-to-analog converter for filtering the analog signal transformed by the first digital-to-analog converter to generate a first baseband signal.

4. The GFSK/FSK modulation circuit of claim 3 further comprising a first mixer coupled to the first low-pass filter for mixing the first base-band signal generated by the first low-pass filter with a first carrier signal.

5. The GFSK/FSK modulation circuit of claim 1 further comprising a second digital-to-analog converter coupled to the second read only memory for transforming the data outputted from the second read only memory into an analog signal.

6. The GFSK/FSK modulation circuit of claim 5 further comprising a second low-pass filter coupled to the second digital-to-analog converter for filtering the analog signal transformed by the second digital-to-analog converter to generate a second base-band signal.

7. The GFSK/FSK modulation circuit of claim 6 further comprising a second mixer coupled to the second low-pass filter for mixing the second base-band signal generated by the second low-pass filter with a second carrier signal.

8. The GFSK/FSK modulation circuit of claim 7 further comprising a subtractor coupled to the first mixer and the second mixer, the subtractor is used for generating a difference between the signals outputted from the first mixer and the second mixer.

9. The GFSK/FSK modulation circuit of claim 1 wherein the integrator is an accumulator.

10. The GFSK/FSK modulation circuit of claim 1 wherein the buffer, the integrator, the first read only memory, the second read only memory and the third read only memory are implemented by digital circuits.

11. The GFSK/FSK modulation circuit of claim 1 further comprising an adjuster coupled to the third read only memory and the integrator, the adjuster is used for adjusting the data outputted from the third read only memory.

12. The GFSK/FSK modulation circuit of claim 1 further comprising a selector for selecting whether to input the data outputted from the buffer into the third read only memory or not.

13. The GFSK/FSK modulation circuit of claim 12 wherein the selector is coupled to the buffer.

14. The GFSK/FSK modulation circuit of claim 1 further comprising a test circuit coupled between the frequency divider and the buffer, the test circuit is used for generating a pseudo random noise according to the sampling signal generated by the frequency divider.

15. The GFSK/FSK modulation circuit of claim 14 further comprising an exclusive OR gate including a first input end coupled to an output end of the test circuit for receiving the pseudo random noise and a second input end for receiving an input signal.

16. The GFSK/FSK modulation circuit of claim 15 wherein the exclusive OR gate sends an output signal to the buffer after the pseudo random noise and the input signal pass through the exclusive OR gate.

17. A Gaussian frequency shift keying/frequency shift keying (GFSK/FSK) modulated method comprising:
dividing a frequency of a clock signal to generate a sampling signal;
storing inputted data;
integrating the stored data wherein integrating the stored data comprises:
over-sampling the stored data and storing the data after over-sampling;
transferring the data after over-sampling according to a Gaussian function; and
integrating the data transferred by the Gaussian function;
transferring the data after integration according to a cosine function; and
transferring the data after integration according to a sine function.

18. The method of claim 17 further comprising:
transforming the data transferred by the cosine function into a first analog signal;
generating a first base-band signal according to the first analog signal; and
mixing the first base-band signal with a first carrier signal to generating a first mixing signal.

19. The method of claim 17 further comprising:
transforming the data transferred by the sine function into a second analog signal;
generating a second base-band signal according to the second analog signal; and
mixing the second base-band signal with a second carrier signal to generating a second mixing signal.

20. The method of claim 19 further comprising:
subtracting the first mixing signal from the second mixing signal.

21. The method of claim 17 further comprising:
selecting whether to transfer the data after over-sampling according to the Gaussian function or not.

* * * * *